(12) United States Patent
Choi et al.

(10) Patent No.: US 10,998,768 B2
(45) Date of Patent: May 4, 2021

(54) RESONANCE CONVERTER FOR WIRELESS CHARGER AND METHOD FOR IMPLEMENTING THE SAME

(71) Applicant: Foundation of Soongsil University-Industry Cooperation, Seoul (KR)

(72) Inventors: Woojin Choi, Seoul (KR); Hung Tran Duc, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 515 days.

(21) Appl. No.: 15/766,749

(22) PCT Filed: Nov. 17, 2016

(86) PCT No.: PCT/KR2016/013274
§ 371 (c)(1),
(2) Date: Apr. 6, 2018

(87) PCT Pub. No.: WO2017/086714
PCT Pub. Date: May 26, 2017

(65) Prior Publication Data
US 2018/0294674 A1    Oct. 11, 2018

(30) Foreign Application Priority Data

Nov. 20, 2015  (KR) .................. 10-2015-0163060
Oct. 28, 2016  (KR) .................. 10-2016-0141559

(51) Int. Cl.
*H02J 50/12*     (2016.01)
*H02M 3/335*    (2006.01)
(Continued)

(52) U.S. Cl.
CPC .............. *H02J 50/12* (2016.02); *B60L 53/12* (2019.02); *B60L 53/22* (2019.02); *B60L 53/38* (2019.02);
(Continued)

(58) Field of Classification Search
CPC ......... H02J 50/12; H02J 7/0071; B60L 53/12; B60L 53/22; B60L 53/38
(Continued)

(56) References Cited

U.S. PATENT DOCUMENTS

2011/0254377  A1 *  10/2011  Wildmer .............. B60L 53/122
                                                          307/104
2012/0281441  A1   11/2012  Liu et al.
(Continued)

FOREIGN PATENT DOCUMENTS

JP    2012-085378 A    4/2012
JP    2014-124019 A    7/2014
(Continued)

*Primary Examiner* — Edward Tso
*Assistant Examiner* — Aaron Piggush
(74) *Attorney, Agent, or Firm* — Novick, Kim & Lee, PLLC; Sang Ho Lee

(57) ABSTRACT

Provided is a resonance converter for a wireless charger, which includes a full bridge inverter connected to an input power source that supplies an input voltage and having first to fourth switches, a resonance tank having a plurality of resonators composed of capacitors and coils connected in series and configured to receive the input voltage from the full bridge inverter and perform voltage conversion in an inductive power transfer manner among the plurality of resonators, and a rectification bridge configured to rectify an output voltage sent from the resonance tank and transfer the rectified output voltage to a battery.

7 Claims, 13 Drawing Sheets

(51) Int. Cl.
    *B60L 53/22*         (2019.01)
    *B60L 53/38*         (2019.01)
    *B60L 53/12*         (2019.01)
    *H02J 7/02*          (2016.01)
    *H02M 1/00*         (2006.01)
    *H02J 7/00*          (2006.01)

(52) U.S. Cl.
    CPC ....... *H02M 3/33507* (2013.01); *H02J 7/0071* (2020.01); *H02J 7/025* (2013.01); *H02M 2001/0019* (2013.01); *Y02T 10/70* (2013.01)

(58) Field of Classification Search
    USPC ................................ 320/108, 133, 142, 158
    See application file for complete search history.

(56) References Cited

U.S. PATENT DOCUMENTS

| | | | |
|---|---|---|---|
| 2015/0194811 A1 | 7/2015 | Mao | |
| 2015/0194814 A1* | 7/2015 | Taylor | H02J 5/005 307/31 |

FOREIGN PATENT DOCUMENTS

| | | |
|---|---|---|
| JP | 2015-029404 A | 2/2015 |
| JP | 6169380 B2 | 7/2017 |
| KR | 10-0547290 B1 | 1/2006 |
| KR | 10-0577472 B1 | 5/2006 |
| KR | 10-1286509 B1 | 7/2013 |
| KR | 10-2015-0014504 A | 2/2015 |

* cited by examiner

RESONANCE CONVERTER FOR WIRELESS CHARGER AND METHOD FOR IMPLEMENTING THE SAME

TECHNICAL FIELD

The present disclosure relates to a resonance converter for a wireless charger and a method for implementing the same, and more particularly, to a resonance converter for a wireless charger to perform constant-current and constant-voltage charging and a method for implementing the same.

BACKGROUND ART

Until recently, a plug-in charging method of connecting an electric vehicle and a system through a cable was most widely used in order to charge a battery of an electric vehicle (EV). However, the plug-in charging method has some disadvantages, such as safety problem due to the exposure of an electric plug.

To solve this problem, a wireless power transfer (WPT) method has been proposed. The wireless power transfer method has recently become a popular trend because it requires no wire connection, is capable of safely recharging a device, and is convenient.

As a representative example of the wireless power transfer method, there is an inductive wireless power transfer system using two resonant coils of a short distance. A topology of the inductive wireless power system may have maximum efficiency when an air gap is short. On the contrary, as the distance between a sender terminal and a receiver terminal increases, the magnetic coupling becomes weaker and the efficiency decreases rapidly. Thus, various methods for increasing the magnetic coupling are being studied.

For example, a method using a high permeability material such as ferrite has been proposed, but it is unsuitable to apply the high permeability material to an electric vehicle since the high permeability material increases size, weight and cost of the electric vehicle. Alternatively, a 3-coil system has been proposed which improves the coupling efficiency by adding intermediate coils. However, since it is impossible to achieve a zerophase angle (ZPA) condition in the charging operation, switching is impossible, and switching loss is inevitably caused due to a narrow soft switching range. In particular, primary switch elements are one of the major causes of reducing overall system efficiency.

Meanwhile, in a charging device, it is also important whether constant-current (CC) and constant-voltage (CV) charging can be performed. In a resonance converter applied to a wireless charger, a wide range of frequency change is required for constant-current and constant-voltage charging.

As a control method for constant-voltage charging, for example, it is possible to control an output voltage by a pulse frequency modulation (PFM) method, but a wide range of frequency change is inevitable, and in an overall charging operation, it is impossible to satisfy the zero phase angle condition. Alternatively, a control method combining phase shift and PFM has been proposed. This control method may achieve a soft switching condition of the primary switch elements by using the hardware for detecting the zero-crossing of the primary current. However, since an additional DC-DC converter is required to control a thrust voltage, this control method has drawbacks such as complicated implementation and an increased manufacturing cost.

DISCLOSURE

Technical Problem

In one aspect, the present disclosure is directed to providing a resonance converter for a wireless charger, which may perform voltage conversion in an inductive power transfer manner between a primary resonance tank and a secondary resonance tank, respectively including an intermediate resonator in addition to a sender resonator and a receiver resonator.

In another aspect, the present disclosure is directed to providing a method for implementing a resonance converter for a wireless charger, which may implement a resonance tank including two intermediate resonators for performing constant-current and constant-voltage charging under a zero phase angle condition.

Technical Solution

According to one general aspect of the present invention, there is provided a resonance converter for a wireless charger, comprising of: a full bridge inverter connected to an input power source that supplies an input voltage and having first to fourth switches; a resonance tank having a plurality of resonators composed of capacitors and coils connected in series and configured to receive the input voltage from the full bridge inverter and perform voltage conversion in an inductive power transfer manner among the plurality of resonators; and a rectification bridge configured to rectify an output voltage sent from the resonance tank and transfer the rectified output voltage to a battery.

Meanwhile, the resonance tank may include a primary resonance tank having a first resonator connected to the full bridge inverter and a first intermediate resonator loosely coupled to the first resonator and a secondary resonance tank having a second resonator connected to the rectification bridge and a second intermediate resonator loosely coupled to the second resonator, and perform voltage conversion in an inductive power transfer manner among four resonators of the primary resonance tank and the secondary resonance tank.

In addition, when operating under a constant-current mode frequency condition with a fixed frequency, the resonance tank may output a current with a constant magnitude to the rectification bridge.

In addition, when the resonance tank operates under the constant-current mode frequency condition, a zero phase angle condition of an input impedance may be achieved so that the first to fourth switches provided at the full bridge inverter performs a switching operation under a soft switching condition.

In addition, when operating under a constant-voltage mode frequency condition with a fixed frequency, the resonance tank may output a voltage of a constant magnitude to the rectification bridge.

In addition, when the resonance tank operates under the constant-voltage mode frequency condition, a zero phase angle condition of an input impedance may be achieved so that the first to fourth switches provided at the full bridge inverter performs a switching operation under a soft switching condition.

Meanwhile, in another aspect of the present disclosure, there is also provided a resonance converter for a wireless charger, comprising of: a full bridge inverter connected to an input power source that supplies an input voltage and having first to fourth switches; a resonance tank having a plurality of resonators composed of capacitors and coils connected in series and configured to receive the input voltage from the full bridge inverter and perform voltage conversion in an inductive power transfer manner among the plurality of resonators; a rectification bridge configured to rectify an output voltage sent from the resonance tank and transfer the rectified output voltage to a battery; and a control circuit configured to control the full bridge inverter so that a sufficient phase margin is provided at a crossover frequency of a constant-current mode for constant-current charging of the battery and a constant-voltage mode for constant-voltage charging of the battery.

Meanwhile, the resonance tank may include a primary resonance tank having a first resonator connected to the full bridge inverter and a first intermediate resonator loosely coupled to the first resonator, and a secondary resonance tank having a second resonator connected to the rectification bridge and a second intermediate resonator loosely coupled to the second resonator, and perform voltage conversion in an inductive power transfer manner among four resonators of the primary resonance tank and the secondary resonance tank.

In addition, when operating under a constant-current mode frequency condition with a fixed frequency, the resonance tank may output a current of a constant magnitude to the rectification bridge.

In addition, when the resonance tank operates under the constant-current mode frequency condition, a zero phase angle condition of an input impedance may be achieved so that the first to fourth switches provided at the full bridge inverter performs a switching operation under a soft switching condition.

In addition, when operating under a constant-voltage mode frequency condition with a fixed frequency, the resonance tank may output a voltage of a constant magnitude to the rectification bridge.

In addition, when the resonance tank operates under the constant-voltage mode frequency condition, a zero phase angle condition of an input impedance may be achieved so that the first to fourth switches provided at the full bridge inverter performs a switching operation under a soft switching condition.

In addition, the control circuit may include: a mode change switch configured to compare a power of the battery with a reference power and perform a switching operation so that different controls are performed depending on the constant-current mode or the constant-voltage mode; a PI controller configured to control a switching operation of switching elements provided at the full bridge inverter so that the resonance tank operates in an inductive region; and an anti-windup circuit configured to reduce an overshoot and transient time caused by the operation of the PI controller.

Meanwhile, in another aspect of the present disclosure, there is also provided a method for implementing a resonance converter for a wireless charger, which includes a resonance tank for performing voltage conversion in an inductive power transfer manner between a primary resonance tank having a first resonator and a first intermediate resonator loosely coupled to the first resonator and a secondary resonance tank having a second resonator and a second intermediate resonator loosely coupled to the second resonator, to transfer a voltage of an input terminal connected to the primary resonance tank to an output terminal connected to the secondary resonance tank, the method comprising: setting self-inductance of a first coil included in the first resonator and a fourth coil included in the second resonator to maximize a coupling coefficient between the first coil and the fourth coil; calculating the number of turns of a second coil included in the first intermediate resonator and a third coil included in the second intermediate resonator so that the second coil and the third coil respectively have a maximum quality recognition value; setting resonance frequencies of the first to fourth coils; and calculating capacitance of first to fourth capacitors connected to the first to fourth coils in series depending on the inductance and the resonance frequency of the first to fourth coils, thereby implementing the resonance tank.

Meanwhile, the first resonator may be connected to a full bridge inverter that is provided at the input terminal and has first to fourth switches to transfer the input voltage to the resonance tank, and the second resonator may be connected to a rectification bridge that is provided at the output terminal and has first to fourth diodes to rectify an output of the resonance tank.

Advantageous Effects

According to an embodiment of the present disclosure as described above, since constant-current and constant-voltage charging may be performed under a fixed frequency condition regardless of load change, it is possible to allow simple control and ensure the stability of the charger.

REFERENCE SIGNS

Figure 1:
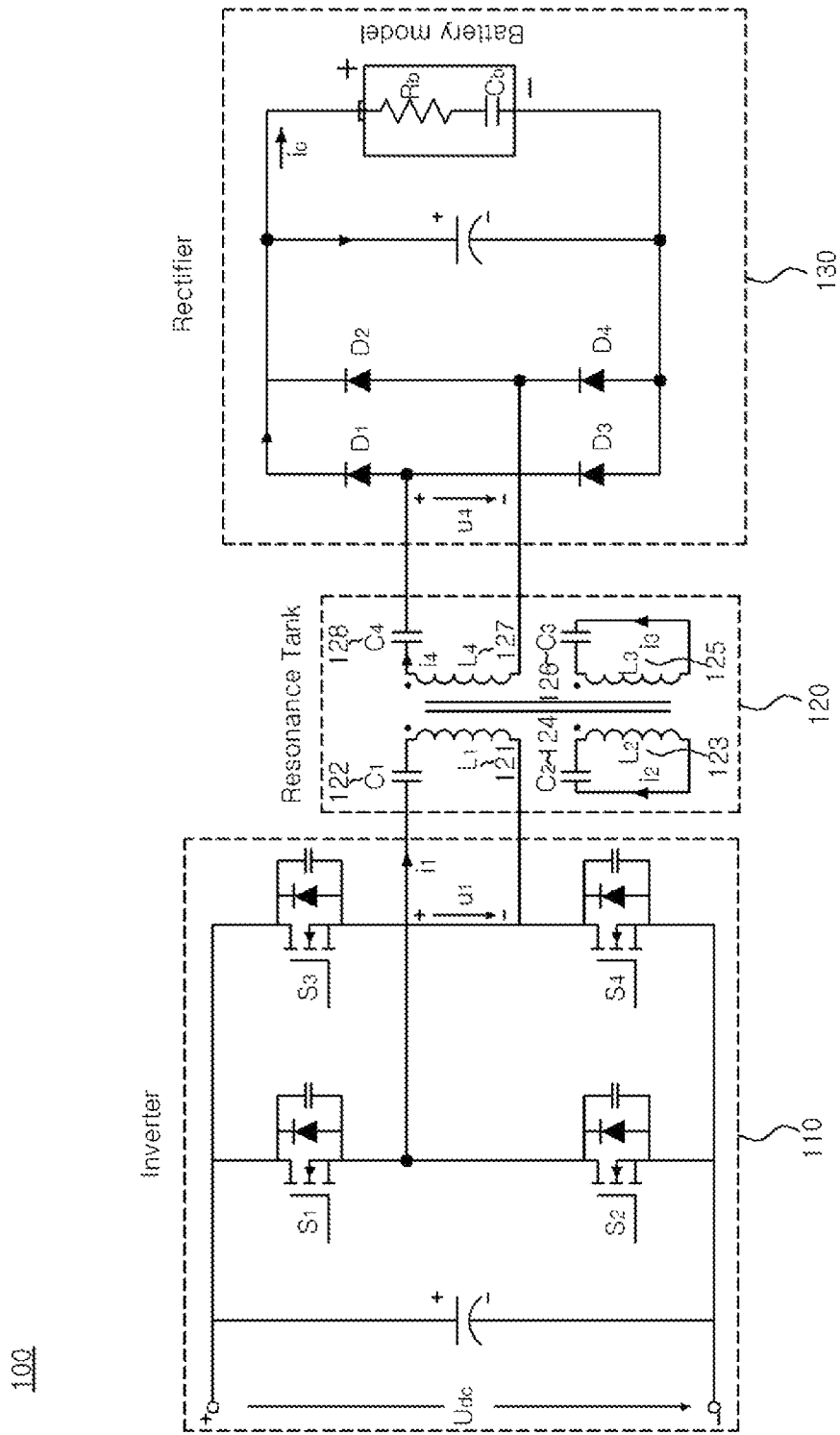
FIG. 1 is a schematic circuit diagram showing a resonance converter for a wireless charger according to an embodiment of the present disclosure.

100: resonance converter for a wireless charger
110: full bridge inverter
120: resonance tank
130: rectification bridge

BEST MODE

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

Hereinafter, preferred embodiments of the present disclosure will be described in more detail with reference to the drawings.

Figure 2:
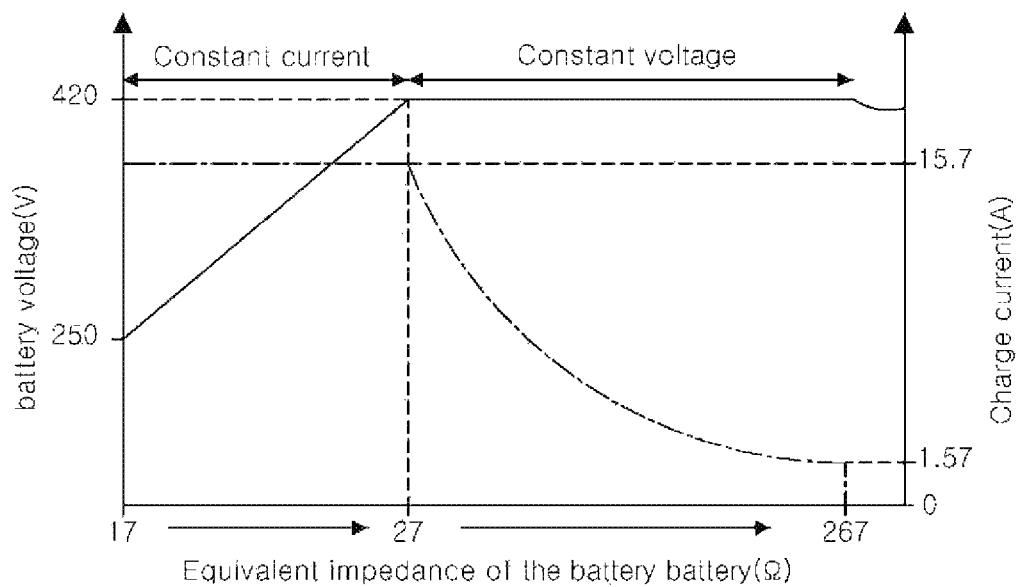
FIG. 2 shows an example of a measured equivalent impedance of the battery depicted in FIG. 1.

FIG. 1 is a schematic circuit diagram showing a resonance converter for a wireless charger according to an embodiment of the present disclosure, and FIG. 2 shows an example of a measured equivalent impedance of the battery depicted in FIG. 1.

Referring to FIG. 1, a resonance converter 100 for a wireless charger according to an embodiment of the present disclosure is a converter for a battery charging device that supports wireless charging and may convert a voltage ($U_{dc}$) of an input terminal in an inductive power transfer manner and transfer the converted voltage to a battery. For this, the resonance converter 100 may include a full bridge inverter 110, a resonance tank 120 and a rectification bridge 130. In particular, the resonance tank 120 is a loosely coupled transformer having two intermediate resonators, and for example, may perform constant-current/constant-voltage charging of the battery connected to an output terminal when the resonance converter 100 for a wireless charger according to an embodiment of the present disclosure operates under the conditions as in Table 1 below. In other words, the battery connected to the output terminal of the resonance converter 100 for a wireless charger according to an embodiment of the present disclosure may have equivalent impedance as shown in FIG. 2 while charging is in progress.

TABLE 1

| Parameters | Symbol | Value |
|---|---|---|
| Nominal input voltage | $U_{dc}$ | 400 V |
| Battery voltage | $U_o$ | 250-420 V |
| Rated output power | $P_o$ | 6.6 kW |
| Nominal charging current | $I_o$ | 15.7 A |
| Cut-off current | $I_{co}$ | 1.57 A |
| Equivalent load impedance | $R_o$ | 17-267 Ω |

Hereinafter, each component of the resonance converter 100 for a wireless charger according to an embodiment of the present disclosure will be described in detail.

First, the full bridge inverter 110 includes a full bridge circuit having a first switch ($S_1$) to a fourth switch ($S_4$), and the full bridge circuit may be connected to an input terminal supplying the input voltage ($U_{dc}$) to transfer the input voltage ($U_{dc}$) to the resonance tank 120 according to switching operations of the first switch ($S_1$) to the fourth switch ($S_4$).

In detail, the full bridge inverter 110 includes a full bridge circuit in which a first leg having the first switch ($S_1$) and the third switch ($S_3$) and a second leg having the second switch ($S_2$) and the fourth switch ($S_4$) are connected in parallel, and upper contact points and lower contact points of the first leg and the second leg may be respectively connected to an input capacitor that supplies the input voltage ($U_{dc}$).

The resonance tank 120 is a loosely coupled transformer having two intermediate resonators and may be briefly classified into a primary resonance tank and a secondary resonance tank. The primary resonance tank may include a first resonator connected to the full bridge inverter 110 and a first intermediate resonator loosely coupled to the first resonator, and the secondary resonance tank may include a second resonator connected to the rectification bridge 130 and a second intermediate resonator loosely coupled to the second resonator. The first resonator, the second resonator, the first intermediate resonator and the second intermediate resonator may be a serial-serial resonance tank composed of coils and capacitors, and the coils may be loosely coupled to perform voltage conversion in an inductive power transfer manner between the primary resonance tank and the secondary resonance tank. In other words, the resonance tank 120 may be a serial-serial four-coil compensation topology and perform energy transfer among the four loosely coupled coils.

In detail, the primary resonance tank may include a first resonator connected to the full bridge inverter 110 and a first intermediate resonator loosely coupled to the first resonator, the first resonator may include a first coil 121 and a first capacitor 122 connected in series, and the first intermediate resonator may include a second coil 123 and a second capacitor 124 connected in series. The first resonator may be implemented on an input voltage line that connects two legs of the full bridge inverter 110. Here, one end of the first capacitor 122 may be connected between the first switch ($S_1$) and the third switch ($S_3$), the other end of the first capacitor 122 may be connected to one end of the first coil 121, and the other end of the first coil 121 may be connected between the second switch ($S_2$) and the fourth switch ($S_4$). The second coil 123 included in the first intermediate resonator may be loosely coupled to the first coil 121. Moreover, the first coil 121 and the second coil 123 may be loosely coupled to a third coil 125 and a fourth coil 127 included in the secondary resonance tank, explained later.

The secondary resonance tank may include a second resonator connected to the rectification bridge 130 and a second intermediate resonator loosely coupled to the second resonator, the second intermediate resonator may include a third coil 125 and a third capacitor 126 connected in series, and the second resonator may include a fourth coil 127 and a fourth capacitor 128 connected in series. The second resonator may be implemented on an output voltage line that connects two legs of the rectification bridge 130. Here, one end of the fourth capacitor 128 may be connected between a first diode ($D_1$) and a third diode ($D_3$), the other end of the fourth capacitor 128 may be connected to one end of the fourth coil 127, and the other end of the fourth coil 127 may be connected between a second diode ($D_2$) and a fourth diode ($D_4$). The third coil 125 included in the second intermediate resonator may be loosely coupled to the fourth coil 127. Moreover, the third coil 125 and the fourth coil 127 may be loosely coupled to the first coil 121 and the second coil 123 included in the primary resonance tank.

As described above, the resonance tank 120 includes resonance tanks respectively composed of capacitors and coils connected in series and provided at a primary side and a secondary side, and also may further include two intermediate resonators loosely coupled to the resonance tank provided at the primary and secondary sides. Basic features of the resonance tank 120 will be described briefly based on the first harmonic approximation (FHA) with reference to FIGS. 3 and 4. In the equations to which the following explanation refers, $u_1(t)$ represents a basic harmonic voltage of a square wave input voltage of the resonance tank 120, $U_{dc}$ represents an input voltage, co represents an operation frequency of the resonance tank 120, $i_1(t)$ represents a basic harmonic current of a square wave input current of the resonance tank 120, $u_4(t)$ represents a basic harmonic voltage of a square wave output voltage of the resonance tank 120, $i_4(t)$ represents a basic harmonic current of a square wave output current of the resonance tank 120, $I_1$ to $I_4$ respectively represent currents flowing on the first coil 121 to the fourth coil 127, $I_o$ represents an output current, $R_{L,eq}$ represents an equivalent load resistance considering a state of charge of a battery during constant-current/constant-voltage charging, $n_{f21}$ represents a resonance frequency ratio ($f_2/f_1$) of the first coil 121 and the second coil 123, $L_1$, $L_2$, $L_3$ and $L_4$ respectively represent self-inductances of the first coil 121 to the fourth coil 127, $k_{12}$, $k_{13}$, $k_{14}$, $k_{23}$, $k_{24}$ and $k_{34}$ respectively represent coupling coefficients between two coils depicted in FIG. 3, $Z_{pri}$ and $Z_{se}$ respectively represent impedances of the primary resonance tank and the secondary resonance tank, and $Z_{mag}$ represents a mutual impedance between the primary resonance tank and the secondary resonance tank.

Figure 3:
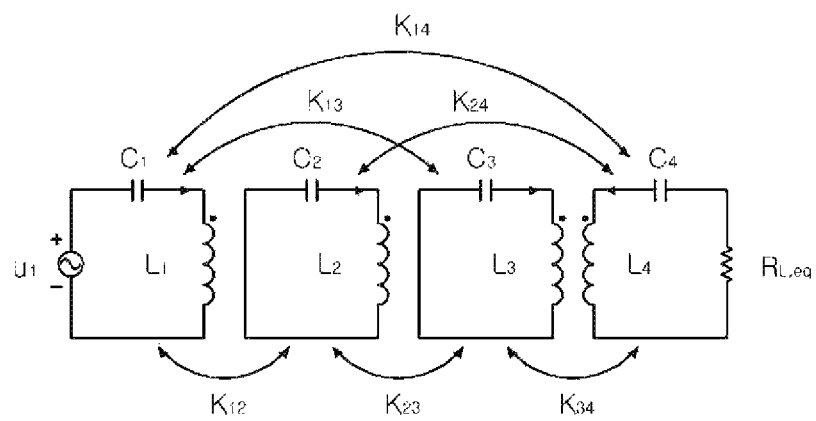
FIG. 3 is a schematic equivalent circuit diagram of the resonance converter for a wireless charger according to an embodiment of the present disclosure, depicted in FIG. 1.
Figure 4:
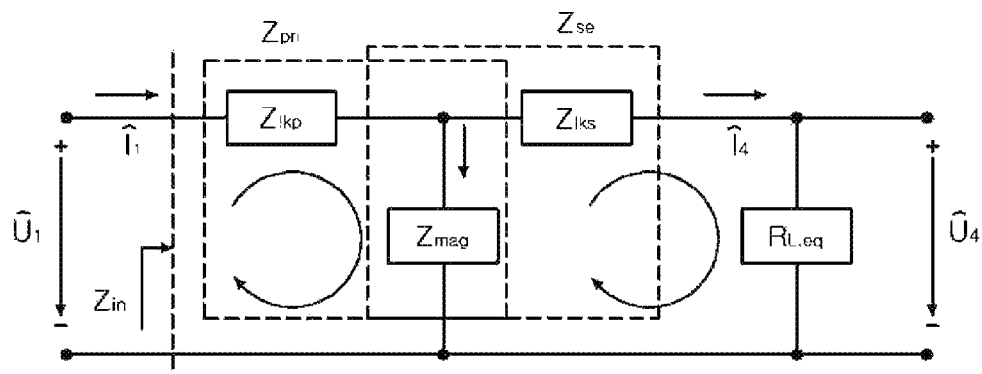
FIG. 4 is a circuit diagram showing an impedance network of the resonance converter for a wireless charger according to an embodiment of the present disclosure.

FIG. 3 is a schematic equivalent circuit diagram of the resonance converter for a wireless charger according to an embodiment of the present disclosure, depicted in FIG. 1, and FIG. 4 is a circuit diagram showing an impedance network of the resonance converter for a wireless charger according to an embodiment of the present disclosure.

First, if all higher harmonics are neglected in a first harmonic approximation (FHA) model of the resonance converter 100 for a wireless charger according to an embodiment of the present disclosure as shown in FIG. 1, an equivalent circuit as shown in FIG. 3 may be obtained. From the first harmonic approximation model of the resonance converter 100 for a wireless charger as shown in FIG. 3, Equation 1 below may be obtained.

$$u_1(t) = \frac{4}{\pi} U_{dc} \cdot \sin(\omega \cdot t + \theta + \varphi) \quad \text{[Equation 1]}$$

-continued $$i_1(t) = I_1 \cdot \sin(\omega \cdot t + \theta)$$

$$u_4(t) = \frac{4}{\pi} U_o \cdot \sin(\omega \cdot t)$$

$$i_4(t) = I_4 \cdot \sin(\omega \cdot t)$$

$$I_4 = \frac{\pi}{2} I_o$$

$$R_{L,eq} = \frac{8}{\pi^2} \frac{U_o^2}{P_o}$$

Also, if the Kirchhoff's Voltage Law is applied to the first harmonic approximation model of the resonance converter 100 for a wireless charger as shown in FIG. 3, a voltage equation as in Equation 2 below may be obtained.

[Equation 2]

$$\frac{\hat{U}_1}{j\omega L_1} = \left(1 - \frac{\omega_1^2}{\omega^2}\right)\hat{I}_1 + k_{12}\sqrt{\frac{L_2}{L_1}}\hat{I}_2 + k_{13}\sqrt{\frac{L_3}{L_1}}\hat{I}_3 + k_{14}\sqrt{\frac{L_4}{L_1}}\hat{I}_4$$

$$0 = k_{12}\sqrt{\frac{L_1}{L_2}}\hat{I}_1 + \left(1 - \frac{\omega_1^2}{\omega^2}n_{f21}^2\right)\hat{I}_2 + k_{23}\sqrt{\frac{L_3}{L_2}}\hat{I}_3 + k_{24}\sqrt{\frac{L_4}{L_2}}\hat{I}_4$$

$$0 = k_{13}\sqrt{\frac{L_1}{L_3}}\hat{I}_1 + k_{23}\sqrt{\frac{L_2}{L_3}}\hat{I}_2 + \left(1 - \frac{\omega_1^2}{\omega^2}n_{f21}^2\right)\hat{I}_3 + k_{24}\sqrt{\frac{L_4}{L_3}}\hat{I}_4$$

$$0 = k_{14}\sqrt{\frac{L_1}{L_4}}\hat{I}_1 + k_{24}\sqrt{\frac{L_2}{L_4}}\hat{I}_2 + k_{34}\sqrt{\frac{L_3}{L_4}}\hat{I}_3 + \left(1 - \frac{\omega_1^2}{\omega^2} + R_{L,eq}\right)\hat{I}_4$$

Here, if it is assumed that parameters of the primary resonance tank and the secondary resonance tank are identical for the convenience of explanation, namely if it is assumed that $L_1=L_4$, $L_2=L_3$, $k_{12}=k_{34}$ and $k_{13}=k_{24}$, the resonance frequency of each coil may be $$f = \frac{1}{2\pi\sqrt{LC}}.$$

Also, since most voltages are applied to the inductance of each coil, the resistance of each coil may be neglected. As a result, the resonance converter 100 for a wireless charger according to an embodiment of the present disclosure may be expressed as a 2-port impedance network as shown in FIG. 4, and at this time, voltage equations of two closed-loop circuits may be expressed as in Equation 3 below.

$$\hat{U}_1 = \hat{I}_1 Z_{pri} - \hat{I}_4 Z_{mag}$$

$$0 = \hat{I}_1 Z_{mag} - \hat{I}_4 (Z_{se} + R_{L,eq}) \quad \text{[Equation 3]}$$

In Equation 3, $Z_{mag}$ represents an effective magnetizing impedance between the primary resonance tank and the secondary resonance tank, and $Z_{pri}$ and $Z_{se}$ respectively represent impedances of the primary resonance tank and the secondary resonance tank. At this time, the impedances of the primary resonance tank and the secondary resonance tank and the effective magnetizing impedance between the primary resonance tank and the secondary resonance tank may be calculated as in Equation 4 below.

$$Z_{pri} = Z_{se} = \qquad \text{[Equation 4]}$$

$$j\omega L_1 \left\{ 1 - \frac{\omega_1^2}{\omega^2} - \frac{(\kappa_{12}^2 + \kappa_{13}^2)\left(1 - \frac{\omega_1^2}{\omega^2} n_{f21}^2\right) - 2\kappa_{12}\kappa_{13}\kappa_{23}}{\left(1 - \frac{\omega_1^2}{\omega^2} n_{f21}^2\right)^2 - \kappa_{23}^2} \right\}$$

$$Z_{mag} = j\omega \sqrt{L_1 L_4}$$

$$\left\{ \kappa_{14} - \frac{2\kappa_{12}\kappa_{13}\left(1 - \frac{\omega_1^2}{\omega^2} n_{f21}^2\right) - \kappa_{23}(\kappa_{12}^2 + \kappa_{13}^2)}{\left(1 - \frac{\omega_1^2}{\omega^2} n_{f21}^2\right)^2 - \kappa_{23}^2} \right\}$$

The resonance converter 100 for a wireless charger according to an embodiment of the present disclosure may perform constant-current and constant-voltage charging of a battery connected to the output terminal by means of the resonance tank 120, and a method for implementing the resonance tank 120 will be described later.

Referring to FIG. 1 again, the rectification bridge 130 includes a full bridge circuit in which a first diode $D_1$ to a fourth diode $D_4$ are provided, and the full bridge circuit is connected to the output terminal to rectify the energy received from the resonance tank 120 by means of the first diode $D_1$ to the fourth diode $D_4$ and transfer the rectified energy to a battery $R_b$, $C_b$.

In detail, the rectification bridge 130 includes a full bridge circuit in which a third leg having the first diode $D_1$ and the third diode $D_3$ and a fourth leg having the second diode $D_2$ and the fourth diode $D_4$ are connected in parallel, and upper and lower contact points of the third leg and the fourth leg may be respectively connected to an output capacitor that is connected to the battery in parallel.

Hereinafter, a method for implementing constant-current and constant-voltage charging in the resonance converter 100 for a wireless charger according to an embodiment of the present disclosure will be described with reference to FIGS. 5 to 9.

Figure 5:
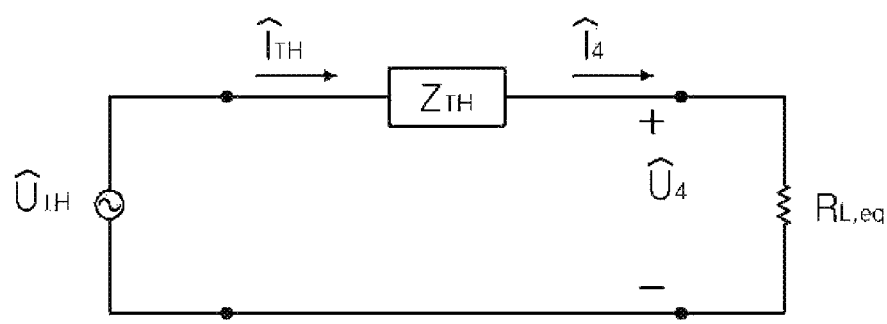
FIGS. 5 to 7 are diagrams showing the resonance converter for a wireless charger according to an embodiment of the present disclosure, depicted in FIG. 4, which is simplified by applying Thevenin's theorem to the impedance network.
Figure 6:
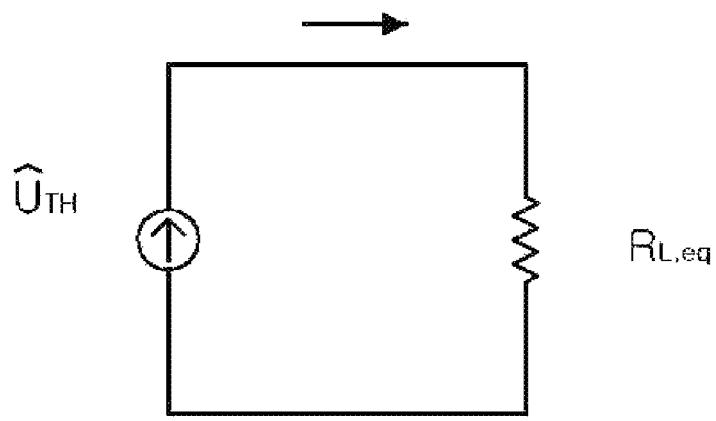
Figure 7:
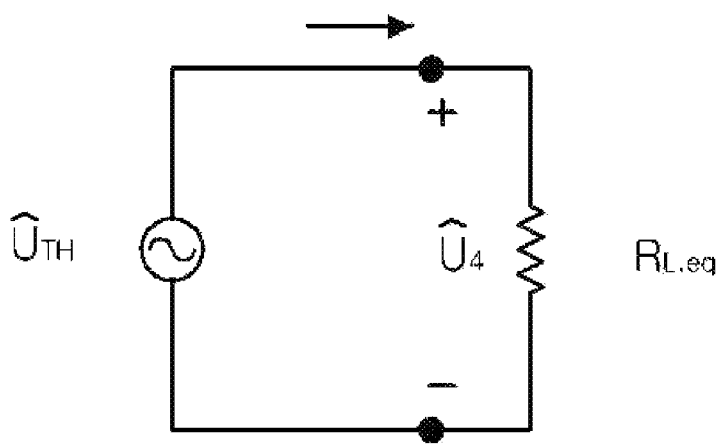
Figure 8:
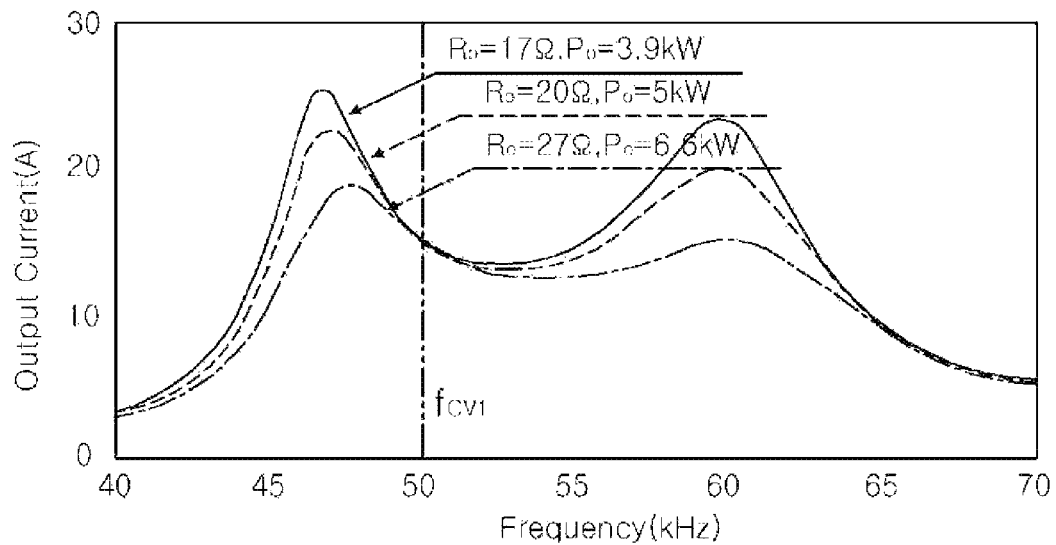
FIG. 8 is a graph showing an output current when the resonance converter according to an embodiment of the present disclosure operates in a constant-current mode for constant-current charging.
Figure 9:
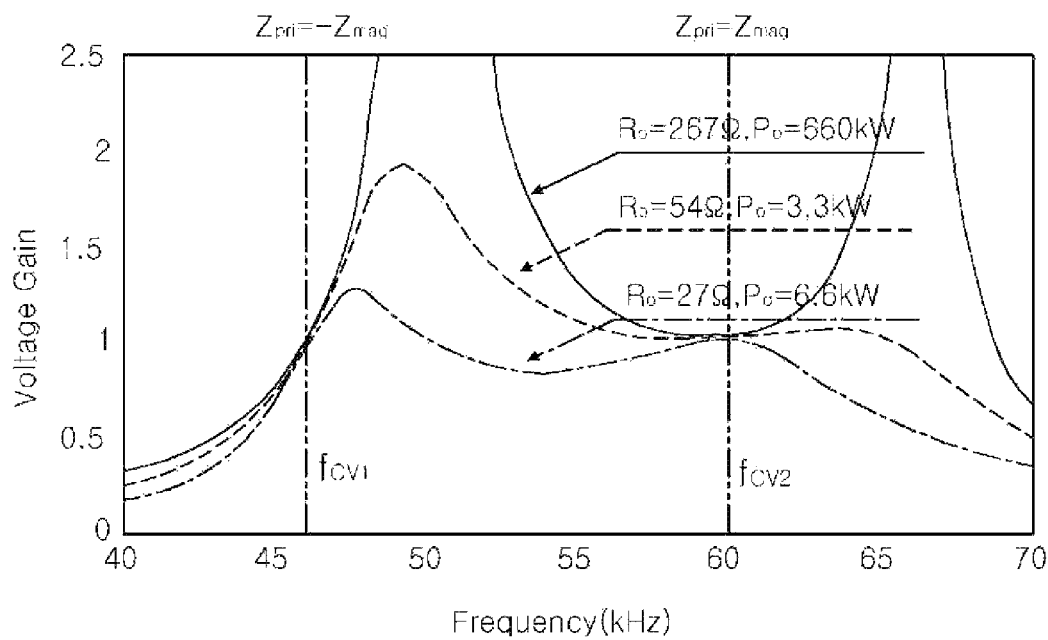
FIG. 9 is a graph showing a voltage gain when the resonance converter according to an embodiment of the present disclosure operates in a constant-voltage mode for constant-voltage charging.

FIGS. 5 to 7 are diagrams showing the resonance converter for a wireless charger according to an embodiment of the present disclosure, depicted in FIG. 4, which is simplified by applying Thevenin's theorem to the impedance network, FIG. 8 is a graph showing an output current when the resonance converter according to an embodiment of the present disclosure operates in a constant-current mode for constant-current charging, and FIG. 9 is a graph showing a voltage gain when the resonance converter according to an embodiment of the present disclosure operates in a constant-voltage mode for constant-voltage charging.

As described above, the resonance converter 100 for a wireless charger according to an embodiment of the present disclosure may implement constant-current and constant-voltage charging of a battery connected to the output terminal. In other words, the resonance converter 100 for a wireless charger according to an embodiment of the present disclosure may serve as a current source and a voltage source, and for such operational characteristics, the resonance tank 120 should be implemented appropriately. In the following equations, $u_1(t)$ represents a basic harmonic voltage of a square wave input voltage of the resonance tank 120, $U_{dc}$ represents an input voltage, co represents an operation frequency of the resonance tank 120, $i_1(t)$ represents a basic harmonic current of a square wave input current of the resonance tank 120, $u_4(t)$ represents a basic harmonic voltage of a square wave output voltage of the resonance tank 120, $i_4(t)$ represents a basic harmonic current of a square wave output current of the resonance tank 120, $I_1$ to $I_4$ respectively represent currents flowing in the first coil 121 to the fourth coil 127, $I_o$ represents an output current, $R_{L,eq}$ represents an equivalent load resistance in consideration of a state of charge of the battery during the constant-current/constant-voltage charging, $n_{f21}$ represents a ratio ($f_2/f_1$) of resonance frequencies of the first coil 121 and the second coil 123, $L_1$, $L_2$, $L_3$ and $L_4$ respectively represent self-inductances of the first coil 121 to the fourth coil 127, $k_{12}$, $k_{13}$, $k_{14}$, $k_{23}$, $k_{24}$ and $k_{34}$ respectively represent coupling coefficients between two coils depicted in FIG. 3, $Z_{pri}$ and $Z_{se}$ respectively represent impedances of the primary resonance tank and the secondary resonance tank, $Z_{mag}$ represents a mutual impedance between the primary resonance tank and the secondary resonance tank, $Z_{in_k}$ represents an input impedance of the resonance tank 120, $\hat{U}_{TH}$, $Z_{TH}$, $|\hat{I}_{TH}|$ and $|\hat{U}_4|$ respectively represent a Thevenin voltage, a Thevenin impedance, a Thevenin current and an output voltage.

Referring to FIG. 4, an impedance network of the resonance converter for a wireless charger according to an embodiment of the present disclosure may be expressed as a 2-port impedance network, and the 2-port impedance network may be expressed more briefly as shown in FIG. 5 by applying the Thevenin's Theorem thereto. Equations for implementing a Thevenin equivalent circuit as shown in FIG. 5 are Equations 5 to 8 below.

$$\hat{U}_{TH} = \hat{U}_1 \frac{Z_{mag}}{Z_{pri}} \qquad \text{[Equation 5]}$$

$$Z_{TH} = \frac{Z_{pri} Z_{se} - Z_{mag}^2}{Z_{pri}} = \frac{Z_{pri}^2 - Z_{mag}^2}{Z_{pri}} \qquad \text{[Equation 6]}$$

$$\hat{I}_{TH} = \frac{\hat{U}_{Th}}{Z_{TH} + R_{L,eq}} = \frac{\hat{U}_1 Z_{mag}}{Z_{pri}^2 - Z_{mag}^2 + Z_{pri} R_{L,eq}} \qquad \text{[Equation 7]}$$

$$\hat{U}_4 = \frac{\hat{U}_{TH} R_{L,eq}}{Z_{TH} + R_{L,eq}} = \hat{U}_1 \frac{Z_{mag} R_{L,eq}}{Z_{pri}^2 - Z_{mag}^2 + Z_{pri} R_{L,eq}} \qquad \text{[Equation 8]}$$

Here, according to Equations 7 and 8, it may be found that the constant-current charging may be implemented by controlling the Thevenin current ($|\hat{I}_{TH}|$) and the output voltage ($|\hat{U}_4|$) constantly regardless of the load resistance $R_{L,eq}$.

In detail, first, looking at Equation 7, it may be found that the Thevenin current ($|\hat{I}_{TH}|$) may have a constant value if the Thevenin impedance ($Z_{TH}$) has a sufficiently greater value than the load resistance ($R_{L,eq}$). In other words, in Equation 7, when the impedance ($Z_{pri}$) of the primary resonance tank becomes 0 (zero) at the operation frequency as in Equation 9 below, the Thevenin current ($|\hat{I}_{TH}|$) may have a constant value regardless of the magnitude of the load resistance.

$$\hat{I}_{TH} = -\frac{\hat{U}_1}{Z_{mag}}, \text{ if } Z_{pri} = 0 \qquad \text{[Equation 9]}$$

In this case, according to Equations 5 and 6, since the Thevenin impedance ($Z_{TH}$) and the Thevenin voltage ($\hat{U}_{TH}$) become infinite, the circuit of FIG. 5 may be expressed as in FIG. 6, and, referring to FIG. 6, it may be found that it is possible to implement the constant-current charging.

Referring to FIG. 8, the change of the output current according to the change of the operation frequency may be found under various load conditions. Here, in case of an operation under the condition that the constant-current frequency ($f_{CC}$) is 50 kHz, it may be found that a constant-current of 15.7 A is the output regardless of the load condition.

In addition, seeing Equation 4 above, since the impedance of the primary resonance tank is identical to the impedance of the secondary resonance tank ($Z_{pri}=Z_{se}$), as in Equation 10 below, the input impedance ($Z_{in}$) may be expressed only with real numbers. Thus, it may be found that the resonance converter 100 for a wireless charger according to an embodiment of the present disclosure may achieve a zero phase angle (ZPA) condition, when operating in a constant-current mode for the constant-current charging. In addition, referring to FIG. 8, it may be found that the phase of the input impedance under the constant-current frequency condition may become 0 (zero).

$$Z_{in} = Z_{pri} - Z_{mag} + \frac{(Z_{se} - Z_{mag} + R_{L,eq})Z_{mag}}{Z_{se} + R_{L,eq}} \quad [\text{Equation 10}]$$
$$= \frac{-Z_{mag}^2}{R_{L,eq}}$$

Meanwhile, from Equation 8, the change of a voltage gain according to the change of the operation frequency may be checked under various load conditions as in FIG. 9. Seeing Equation 8 and FIG. 7, when the Thevenin impedance ($Z_{TH}$) is 0 (zero), it may be found that the output voltage is constant regardless of the load condition. In addition, looking at FIG. 9, it may be found that the resonance converter 100 according to an embodiment of the present disclosure may implement constant-voltage charging when operating under two different constant-voltage mode frequency ($f_{CV1}$, $f_{CV2}$) conditions.

In addition, according to Equation 6, in case of $Z_{pri}^2 - Z_{mag}^2 = 0$ under a resonance frequency condition, it may be found that the Thevenin impedance ($Z_{TH}$) is calculated as 0 (zero). In this case, since the output voltage ($|\hat{U}_4|$) becomes equal to the Thevenin voltage ($\hat{U}_{TH}$) as in FIG. 7, the constant-voltage charging may be performed. At this time, according to Equation 10, the input impedance ($Z_{in}$) and its phase may be expressed as in Equation 11 below.

$$Z_{in} = \frac{Z_{pri}R_{L,eq}}{Z_{Se} + R_{L,eq}}, \arg\frac{-R_{L,eq}}{Z_{mag}} \quad [\text{Equation 11}]$$

Seeing Equation 11, when the load is changed, it may be found that the phase of the input impedance is also changed. Thus, when the resonance converter 100 for a wireless charger according to an embodiment of the present disclosure operates in a constant-voltage mode for implementing the constant-voltage charging, it may seem that the zero phase angle (ZPA) condition cannot be achieved, similar to a conventional converter, but it is possible to achieve the zero phase angle condition even in the constant-voltage mode by implementing that the effective magnetizing impedance ($Z_{mag}$) between the primary resonance tank and the secondary resonance tank has a very great value. In other words, the resonance converter 100 for a wireless charger according to an embodiment of the present disclosure may have a great effective magnetizing impedance between the primary resonance tank and the secondary resonance tank by further including two intermediate resonators in the resonance tank 120, different from the topology of a conventional converter for a wireless charger, and accordingly, the resonance converter 100 for a wireless charger according to an embodiment of the present disclosure may achieve the zero phase angle condition when operating in the constant-voltage mode. This will be described in detail with reference to FIGS. 10a, 10b, 11a and 11b.

FIGS. 10a to 11b are graphs for illustrating a method for realizing constant-voltage charging when the resonance converter for a wireless charger according to an embodiment of the present disclosure is under a zero phase angle condition.

As described above, the resonance converter 100 for a wireless charger according to an embodiment of the present disclosure may include a full bridge inverter 110, a resonance tank 120 and a rectification bridge 130. In the converter, the overall efficiency of the system may be determined depending on a switching loss of switch elements provided at the full bridge inverter 110 and power transfer efficiency at the resonance tank 120. Thus, in order to have high efficiency, it is preferred that the resonance converter 100 for a wireless charger according to an embodiment of the present disclosure is implemented to satisfy the zero phase angle condition for soft switching of the switch elements provided at the full bridge inverter 110. At this time, when the resonance converter 100 for a wireless charger according to an embodiment of the present disclosure operates in the constant-current mode for constant-current charging, the input impedance ($Z_{in}$) may be expressed with real numbers as in Equation 10, and thus the zero phase angle condition may also be naturally achieved.

Meanwhile, when the resonance converter 100 for a wireless charger according to an embodiment of the present disclosure operates in the constant-voltage mode for constant-voltage charging, the condition as in Equation 12 below should be satisfied to achieve the zero phase angle condition.

$$\begin{cases} |Z_{pri}| = |Z_{mag}| \\ Z_{mag} \approx \infty \end{cases} \quad [\text{Equation 12}]$$

According to Equation 12, when the resonance tank 120 is implemented, it may be found that the impedance ($Z_{pri}$) of the primary resonance tank and the effective magnetizing impedance ($Z_{mag}$) between the primary resonance tank and the secondary resonance tank satisfy $Z_{pri}=Z_{mag}$ or $Z_{pri}=-Z_{mag}$.

In detail, first, when the resonance tank 120 is implemented to satisfy $Z_{pri}=Z_{mag}$. Equation 13 below may be derived according to Equations 4 and 12.

$$\begin{cases} 1 - \frac{\omega_1^2 n_{f21}^2}{\omega^2} - k_{14} + \frac{(k_{12} - k_{13})^2}{2k_{23}} = 0 \\ 1 - \frac{\omega_1^2 n_{f21}^2}{\omega^2} + k_{23} = 0 \end{cases} \quad [\text{Equation 13}]$$

According to Equation 13, the ratio of resonance frequency between the first coil 121 and the second coil 123 may be calculated as in Equation 14 below.

$$n_{f21} = \sqrt{\frac{1+k_{23}}{1-k_{14}+\frac{(k_{12}-k_{13})^2}{2k_{23}}}}$$ [Equation 14]

Here, if the ratio of resonance frequency between the first coil 121 and the second coil 123 is implemented to satisfy Equation 14, the resonance converter 100 for a wireless charger according to an embodiment of the present disclosure may achieve the zero phase angle condition when operating in the constant-voltage mode. This means that the switch elements provided at the full bridge inverter 110 may achieve the soft switching condition when operating in the constant-voltage mode.

Figure 10A:
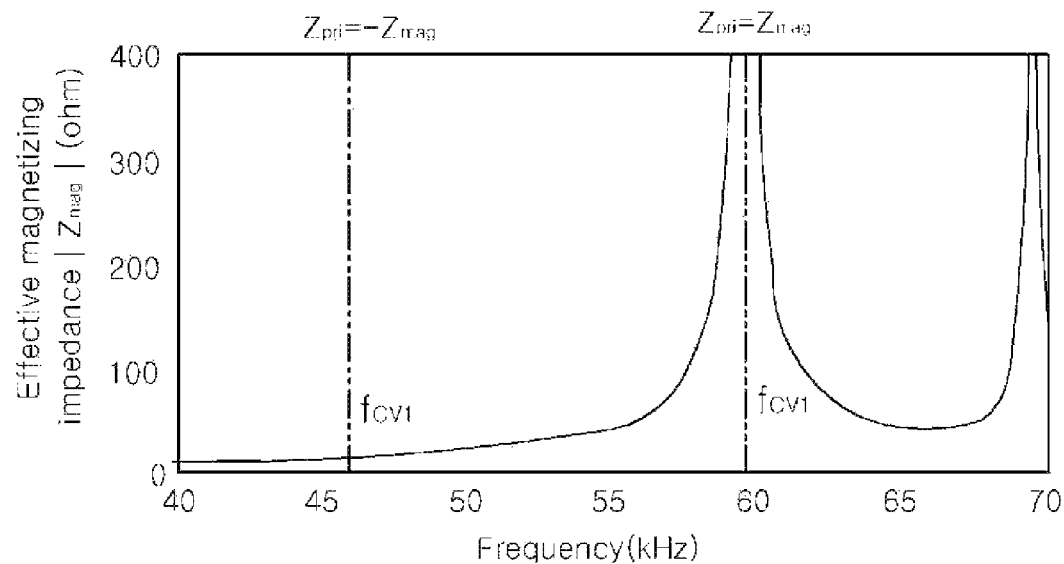
FIGS. 10A, 10B, 11A and 11B are graphs for illustrating a method for realizing constant-voltage charging when the resonance converter for a wireless charger according to an embodiment of the present disclosure is under a zero phase angle condition.
Figure 10B:
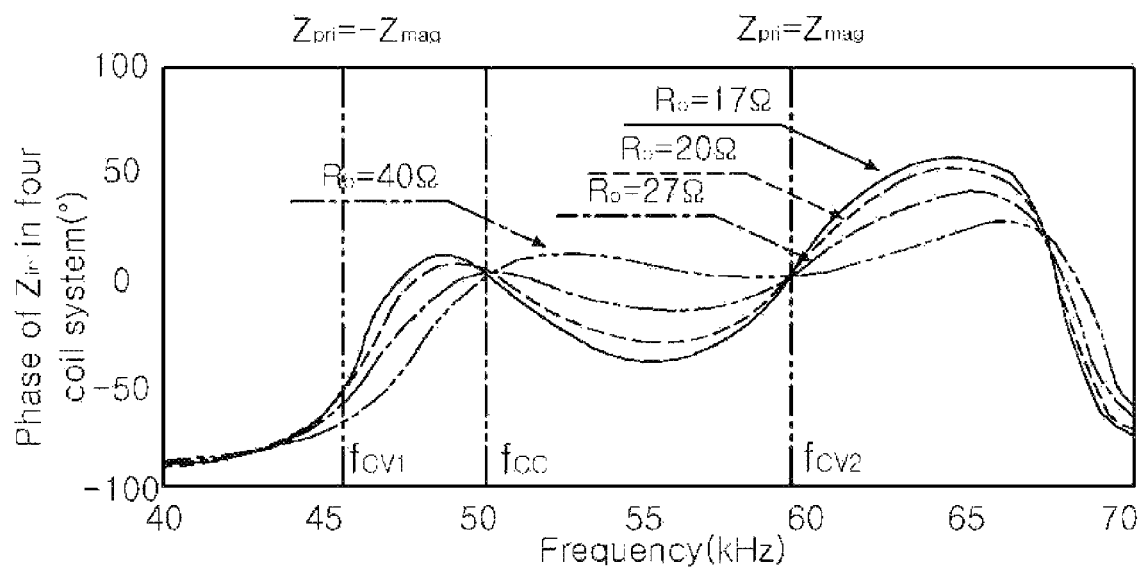

In addition, referring to FIGS. 10a and 10b, when the resonance tank 120 is implemented according to Equation 11, the phase of the input impedance ($Z_{in}$) and the magnitude of the effective magnetizing impedance ($Z_{mag}$) under different load conditions may be checked. According to FIG. 10a, it may be found that the zero phase angle condition can be achieved at the second constant-voltage frequency ($f_{CV2}$), and this is because the effective magnetizing impedance ($Z_{mag}$) has a very great value and accordingly the input impedance ($Z_{in}$) is close to 0 regardless of the load condition. However, on the contrary, according to FIG. 10b, at the first constant-voltage frequency ($f_{CV1}$), the effective magnetizing impedance ($Z_{mag}$) has a very small value and thus the zero phase angle condition cannot be achieved.

Meanwhile, when the resonance tank 120 is implemented to satisfy $Z_{pri}=-Z_{mag}$, according to Equation 13, the ratio of resonance frequency between the first coil 121 and the second coil 123 may be calculated as in Equation 15 below.

$$n_{f21} = \sqrt{\frac{1-k_{23}}{1+k_{14}-\frac{(k_{12}+k_{13})^2}{2k_{23}}}}$$ [Equation 15]

Figure 11A:
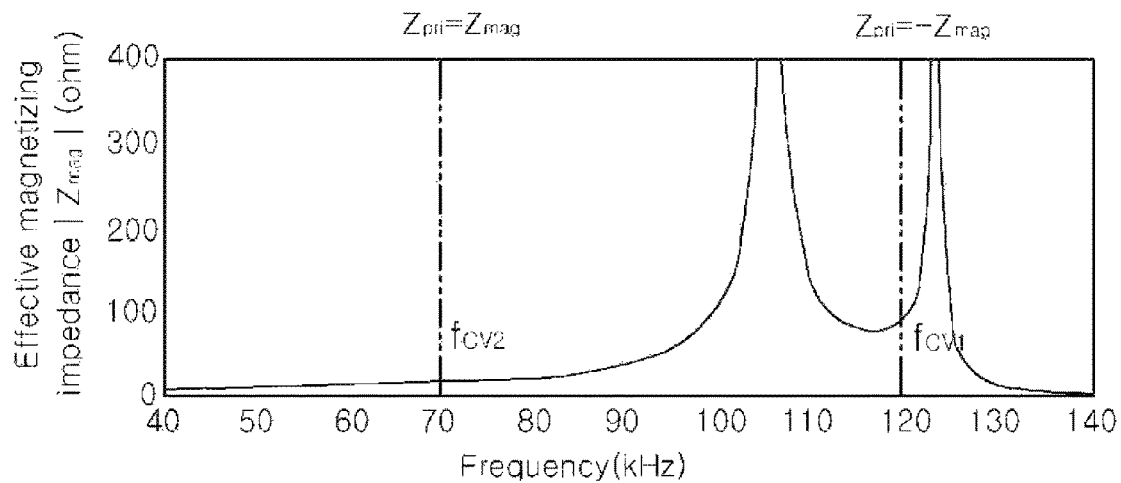
Figure 11B:
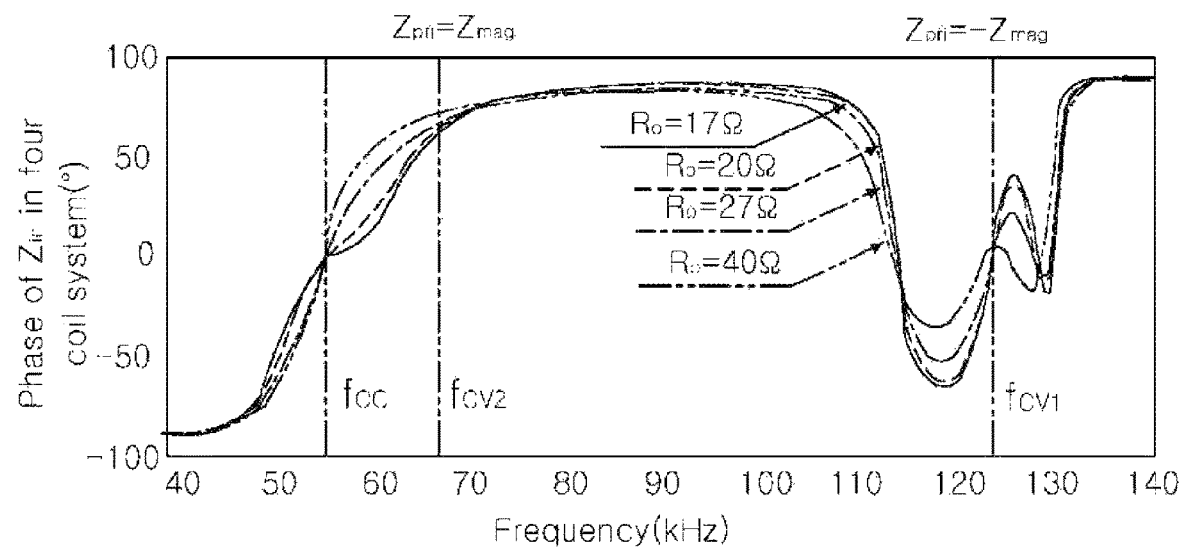

In addition, referring to FIGS. 11a and 11b, when the resonance tank 120 is implemented according to Equation 15, it is possible to find the phase of the input impedance ($Z_{in}$) and the magnitude of the effective magnetizing impedance ($Z_{mag}$) under different load conditions. At this time, since the effective magnetizing impedance ($Z_{mag}$) has a very great value at the first constant-voltage frequency ($f_{CV1}$), different from FIG. 10a, it may be found that the zero phase angle condition can be achieved at the first constant-voltage frequency ($f_{CV1}$).

As described above, the resonance converter 100 for a wireless charger according to an embodiment of the present disclosure may implement the constant-voltage charging under the zero phase angle condition when the resonance tank 120 is implemented to satisfy Equation 15 to operate under the first constant-voltage frequency ($f_{CV1}$) condition or the resonance tank 120 is implemented to satisfy Equation 14 to operate under the second constant-voltage frequency ($f_{CV2}$) condition. At this time, if a difference between the constant-current frequency ($f_{CC}$) and the second constant-voltage frequency ($f_{CV2}$) or the first constant-voltage frequency ($f_{cv1}$), which enables the constant-voltage charging under the zero phase angle condition, is compared with reference to FIGS. 10b and 11b, the resonance tank 120 is implemented to satisfy Equation 14 as shown in FIG. 10b, and thus it may be found that the difference is small during the operation under the second constant-voltage frequency ($f_{CV2}$) condition. Accordingly, in order to realize the constant-voltage charging under the zero phase angle condition, it is preferred that the resonance converter 100 for a wireless charger according to an embodiment of the present disclosure is designed so that the resonance frequency ratio ($n_{f21}$) between the first coil 121 and the second coil 123 satisfies Equation 14 and to operate according to the second constant-voltage frequency ($f_{CV2}$).

Hereinafter, a method for implementing the resonance converter 100 for a wireless charger according to an embodiment of the present disclosure to realize the constant-current and constant-voltage charging will be described in detail. The resonance converter 100 for a wireless charger according to an embodiment of the present disclosure includes the full bridge inverter 110, the resonance tank 120 and the rectification bridge 130 as described above, and the resonance tank 120 should be implemented to satisfy a predetermined condition in order to charge a battery connected to the output terminal in a constant-current and constant-voltage manner. Thus, a method for implementing the resonance tank 120 to realize the constant-current and constant-voltage charging will be described. In the following description, it is assumed that coils included in the resonance tank 120 are planar spiral coils, for example. This is because the planar spiral coils enhance magnetic coupling, compared to rectangular coils or square coils.

The resonance tank 120 includes four resonators in total, including intermediate resonators respectively at a primary side and a secondary side as described above, and in order to implement the four resonators, self-inductances of the coils provided at a sender terminal and a receiver terminal, namely the first coil 121 and the fourth coil 127, may be set first.

For this, an optimum number of turns of the coils may be calculated in a trial-and-error manner based on the following limiting conditions.

First, generally, in an inductive power transfer manner, a diameter of the sender coil is preferably set smaller than 4 times of the distance of the airgap, and the optimum number of turns of the coils may be calculated based on this limiting condition.

In addition, in order to enhance the power efficiency, high magnetic coupling is demanded between coils, and thus the resonators should be designed to have a high coupling coefficient. Moreover, in order to reduce the conduction loss caused by the resistance of the coils, the resonators are preferably designed to have a great quality factor.

In addition, the sender coil and the receiver coil should be designed in consideration of Equation 16 below.

$$\frac{U_o}{U_{dc}} \approx \sqrt{\frac{L_4}{L_1}}$$ [Equation 16]

Based on the limiting conditions in designing the sender coil and the receiver coil, the number of turns of the first coil 121 and the fourth coil 127, namely a sender coil and a receiver coil, is calculated repeatedly to obtain an optimum number of turns which may maximize the coupling coefficient between the sender coil and the receiver coil, and the self-inductances of the first coil 121 and the fourth coil 127 may be calculated by using the same.

Next, self-inductances of the coils of the intermediate resonator, namely the second coil 123 and the third coil 125, may be set. In order to minimize the conduction loss of the coils of the intermediate resonator, it is preferred that their quality factor is set to be 500 to 600. Thus, the optimum number of turns of the coils of the intermediate resonator may be calculated in a trial-and-error manner so that the coils of the intermediate resonator may have a maximum quality factor, and the self-inductances of the second coil 123 and the third coil 125 may be calculated using the same. At this time, Equations 17 and 18 below may be used.

$$L_2 = \frac{r_2 Q_2}{2\pi f} \quad \text{[Equation 17]}$$

$$L_3 = \frac{r_3 Q_3}{2\pi f} \quad \text{[Equation 18]}$$

In Equations 17 and 18, $r_2$ and $r_3$ represent AC resistances of the second coil 123 and the third coil 125, and $Q_2$ and $Q_3$ represent quality factors of the second coil 123 and the third coil 125.

Next, the resonance frequencies of the sender coil and the coils of the intermediate resonator may be set. When the resonance tank 120 operates in the constant-current mode, the resonance frequency of the first coil 121 serving as a sender coil may be calculated as $$f_1 = \frac{1}{2\pi \sqrt{L_1 C_1}}.$$

At this time, the effective magnetizing impedance, namely the effective magnetizing impedance between the primary resonance tank and the secondary resonance tank, may be expressed as Equation 19 below, from Equations 1 and 9.

$$Z_{mag} = \frac{|\hat{U}_1|}{|\hat{I}_4|} = \frac{8 U_{dc}}{\pi^2 I_o} \quad \text{[Equation 19]}$$

At this time, if Equation 4 is applied to Equation 19, Equation 20 below may be obtained.

$$\frac{8 U_{dc}}{\pi^2 I_o} = \left| j\omega \sqrt{L_1 L_4} \left\{ \kappa_{14} - \frac{2\kappa_{12}\kappa_{13}\left(1 - \frac{\omega_1^2}{\omega^2} n_{f21}^2\right) - \kappa_{23}(\kappa_{12}^2 + \kappa_{13}^2)}{\left(1 - \frac{\omega_1^2}{\omega^2} n_{f21}^2\right)^2 - \kappa_{23}^2} \right\} \right| \quad \text{[Equation 20]}$$

In addition, seeing FIG. 8, the constant-current frequency may be set to be 50 kHz, and thus the resonance frequency $f_1$ of the sender coil may be calculated in a numerical method in Equation 20. After that, the resonance frequency $f_2$ of the intermediate coil may be calculated according to the ratio ($n_{f21}$) of the resonance frequencies of the first coil 121 and the second coil 123 as in Equation 21.

$$f_2 = f_1 \cdot n_{f21} \quad \text{[Equation 21]}$$

Finally, if the inductances and resonance frequencies of four coils included in the four resonators are set, the capacitances of the resonance capacitors included in the four resonators may be calculated using the same as in Equation 22 below.

$$C_1 = \frac{1}{\omega_1^2 L_1}, \; C_2 = \frac{1}{\omega_2^2 L_2}, \; C_3 = \frac{1}{\omega_2^2 L_3}, \; C_4 = \frac{1}{\omega_1^2 L_4} \quad \text{[Equation 22]}$$

When being implemented according to the above method, the resonance converter 100 for a wireless charger according to an embodiment of the present disclosure may perform constant-current and constant-voltage charging under each fixed frequency condition and may achieve the zero phase angle condition during the constant-current and constant-voltage charging so that the primary switch elements may achieve the soft switching condition. However, the resonance converter 100 for a wireless charger according to an embodiment of the present disclosure is able to have the above characteristic only when the output voltage of the front-end PFC converter is always constant. In other words, when the output voltage of the front-end PFC converter is not constant, the resonance converter 100 for a wireless charger according to an embodiment of the present disclosure may not have the above characteristic since a deviation occurs in the resonance operation. Accordingly, in order to implement the constant-current and constant-voltage charging under the zero phase angle condition regardless of the change of the AC input voltage, the resonance converter 100 for a wireless charger according to an embodiment of the present disclosure needs to additionally include a closed-loop control circuit. This will be described in detail with reference to FIGS. 12, 13*a* and 13*b*.

Figure 12:
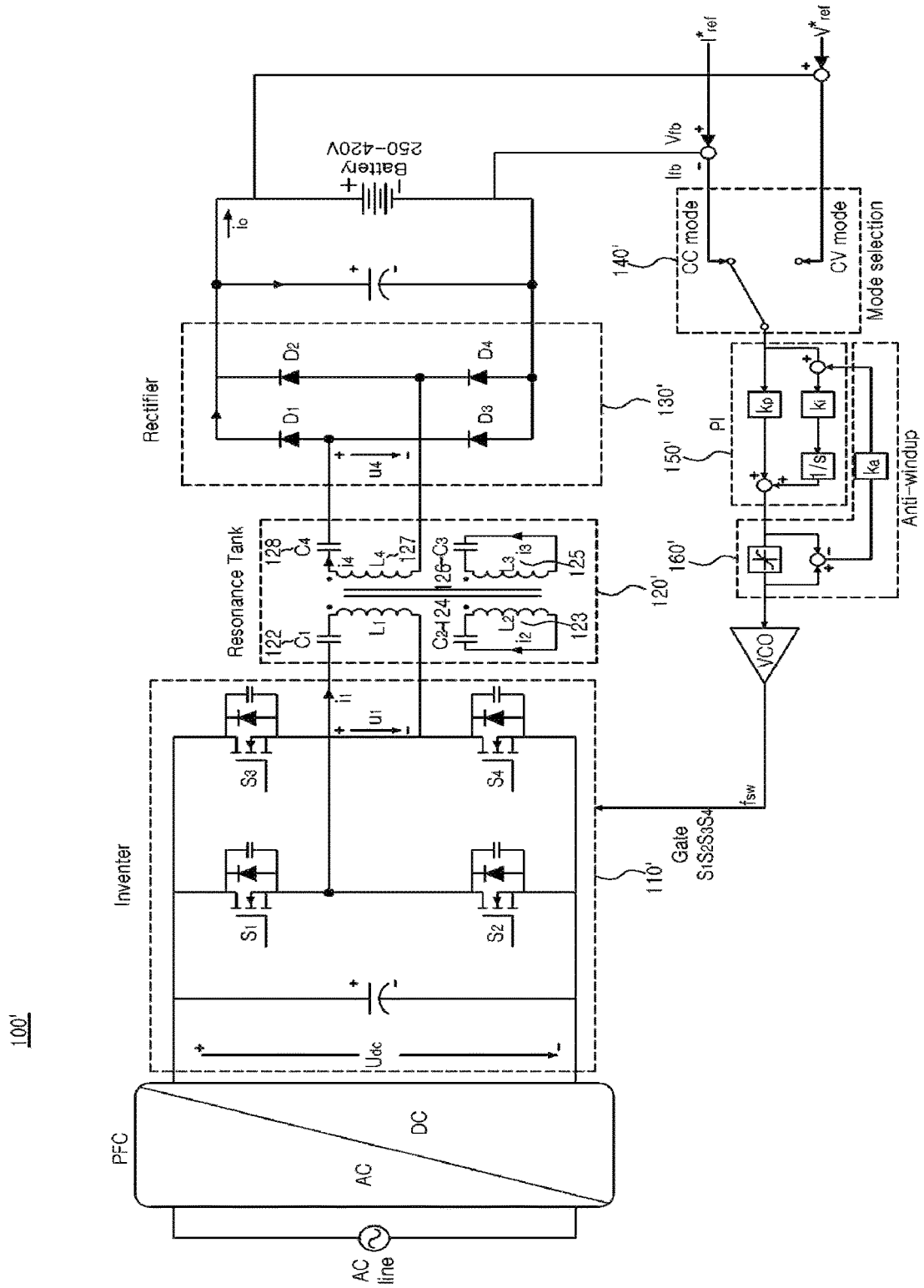
FIG. 12 is a schematic circuit diagram showing a resonance converter for a wireless charger according to another embodiment of the present disclosure.
Figure 13A:
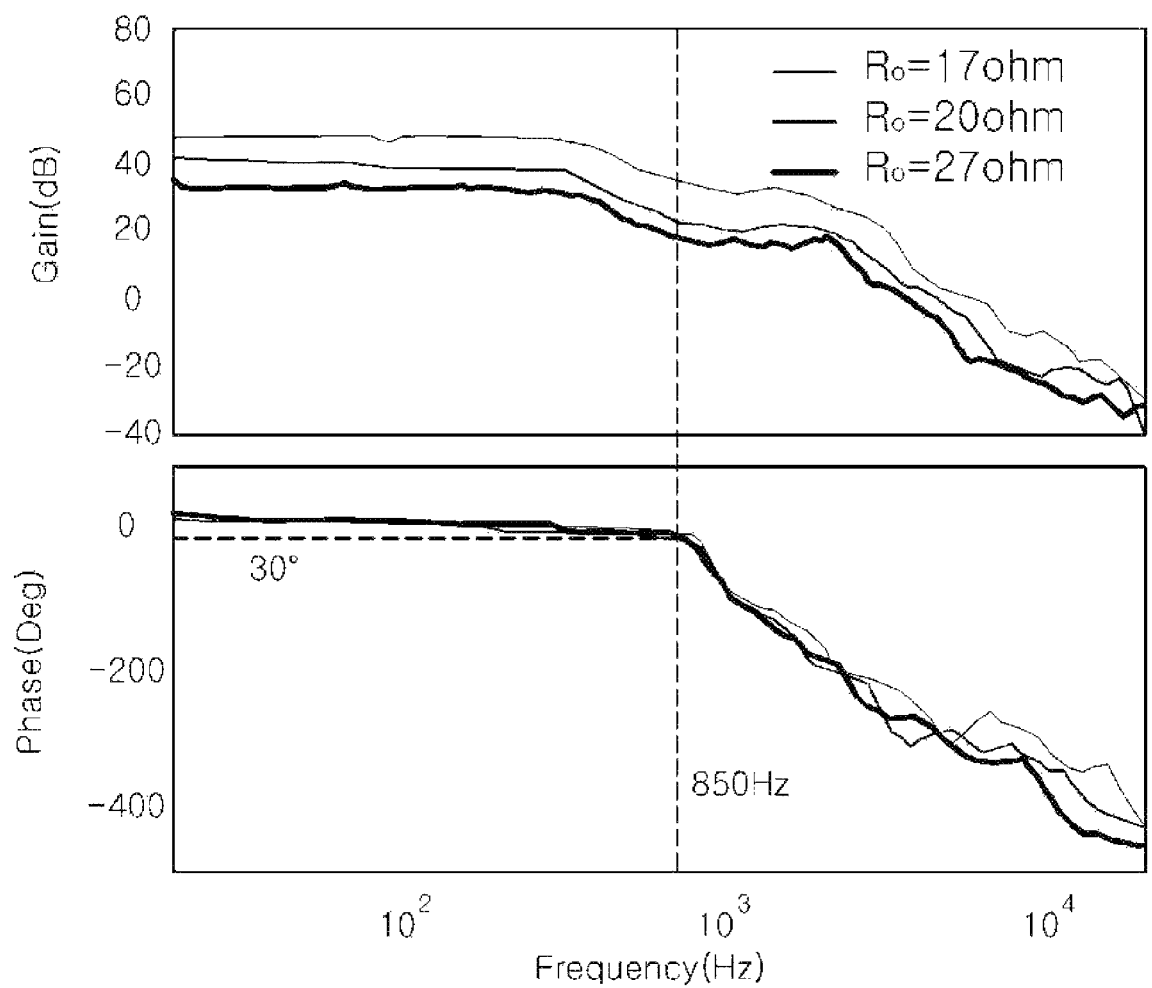
FIGS. 13A and 13B are graphs showing a voltage gain when the resonance converter for a wireless charger according to another embodiment of the present disclosure performs constant-current and constant-voltage charging.
Figure 13B:
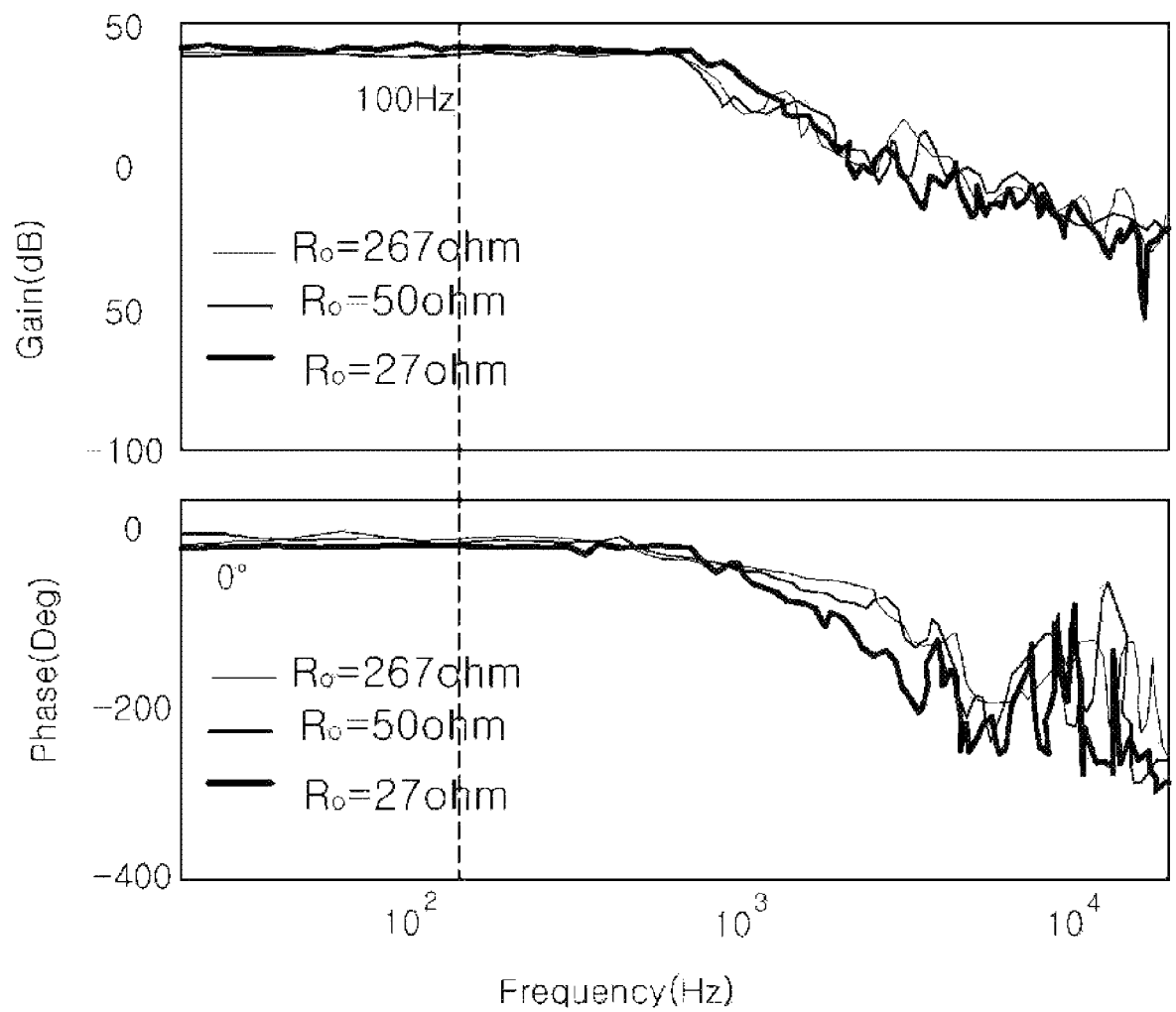

FIG. 12 is a schematic circuit diagram showing a resonance converter for a wireless charger according to another embodiment of the present disclosure, and FIGS. 13*a* and 13*b* are graphs showing a voltage gain when the resonance converter for a wireless charger according to another embodiment of the present disclosure performs constant-current and constant-voltage charging.

Referring to FIG. 12, a resonance converter 100' for a wireless charger according to another embodiment of the present disclosure is a converter for a battery charging device supporting wireless charging, and may convert a voltage ($U_{dc}$) of an input terminal in an inductive power transfer manner and transfer the converted voltage to the battery, and for this, may include a full bridge inverter 100', a resonance tank 200' and a rectification bridge 300', similar to the resonance converter 100 for a wireless charger according to an embodiment of the present disclosure as shown in FIG. 1. In addition, the resonance converter 100' for a wireless charger according to another embodiment of the present disclosure may further include a control circuit composed of a mode change switch 140', a PI controller 150', an anti-windup circuit 160' and a voltage control oscillator (VCO). The control circuit may control such that the resonance converter 100' for a wireless charger according to another embodiment of the present disclosure performs constant-current and constant-voltage charging under the zero phase angle condition, regardless of the change of the output voltage of the front-end PFC converter, as described above. Here, the full bridge inverter 100', the resonance tank 200' and the rectification bridge 300' depicted in FIG. 12 have the same features as the components included in the resonance converter 100 for a wireless charger according to an embodiment of the present disclosure, described above, and thus are not described in detail here, but the control circuit will be described in detail.

The mode change switch 140' may control a switch according to a constant-current or constant-voltage operation mode of the resonance converter 100 for a wireless charger according to another embodiment of the present disclosure. The resonance converter 100' for a wireless charger according to another embodiment of the present disclosure may operate in any one mode of a constant-current mode for charging the battery of the output terminal battery with a constant current and a constant-voltage mode for charging the battery with a constant voltage, and the control circuit may perform different controls depending on the constant-current mode and the constant-voltage mode. Therefore, when the resonance converter 100' for a wireless charger according to another embodiment of the present disclosure operates in the constant-current mode, the mode change switch 140' may connect a comparator of a battery power and a reference current to the PI controller 150', and when the resonance converter 100' for a wireless charger according to another embodiment of the present disclosure operates in the constant-voltage mode, the mode change switch 140' may connect a comparator of a battery power and a reference voltage to the PI controller 150'.

The PI controller 150' may prevent the resonance converter 100' for a wireless charger according to another embodiment of the present disclosure from operating at a frequency lower than the peak voltage frequency under the maximum load (6.6 kW) condition. By this operation of the PI controller 150', the resonance converter 100' for a wireless charger according to another embodiment of the present disclosure may always operate in an inductive region.

The anti-windup circuit 160' may reduce overshoot and transient time that occur due to the operation of the PI controller 150'.

The operating method of the control circuit will be described briefly. The resonance converter 100' for a wireless charger according to another embodiment of the present disclosure may perform the constant-current charging until the voltage of the battery connected to the output terminal reaches a maximum charge voltage, for example 420V. Accordingly, the control circuit may also operate in the constant-current mode by means of the switching operation of the mode change switch 140'. In addition, if the voltage of the battery connected to the output terminal reaches the maximum charge voltage, the resonance converter 100' for a wireless charger according to another embodiment of the present disclosure may perform the constant-voltage charging, and at this time, the control circuit may also automatically switch to the constant-voltage mode and operate by means of the switching operation of the mode change switch 140'.

In order to check the operation feature of the control circuit, an open circuit transfer function in each operation mode is obtained using the PSIM AC sweep function as shown in FIGS. 13a and 13b. Seeing FIGS. 13a and 13b, bode plots for current and voltage controlling under different load conditions may be found. According to FIGS. 13a and 13b, the switching operations of the switch elements provided at the full bridge inverter 100' may be controlled so as to give a sufficient phase margin at a crossover frequency in each operation mode. For example, as shown in FIG. 13a, the control circuit may give a bandwidth of 850 Hz and a phase margin of 60° when operating in the constant-current mode.

$$G_{ci}(s) = 0.0015 + \frac{21}{s} \qquad \text{[Equation 23]}$$

Alternatively, as shown in FIG. 13b, the control circuit may give a bandwidth of 100 Hz and a phase margin of 90° when operating in the constant-voltage mode.

$$G_{cv}(s) = 0.0001 + \frac{3}{s} \qquad \text{[Equation 24]}$$

Hereinafter, the advantage effects of the resonance converter 100 for a wireless charger according to an embodiment of the present disclosure will be verified with reference to FIGS. 14a to 16.

FIGS. 14a to 16 are diagrams for illustrating advantageous effects of the resonance converter for a wireless charger according to an embodiment of the present disclosure.

First, in order to check the advantage effects of the resonance converter 100 for a wireless charger according to an embodiment of the present disclosure, a converter having the specification as shown in Table 2 below was designed, and an experiment was performed to measure a current flowing in each element and a voltage applied to each element. The measurement results are shown in FIGS. 14a, 14b, 15a and 15b. At this time, the airgap between the primary side and the secondary side of the resonance tank 120 was set to be 200 mm because a mounting distance of a general vehicle is 150 to 300 mm.

TABLE 2

| Parameters | Designed Par. | Measured Par. |
| --- | --- | --- |
| Self inductance $L_1$ | 132 μH | 132.4 μH |
| Self inductance $L_2$ | 80 μH | 79.7 μH |
| Self inductance $L_3$ | 98 μH | 98.3 μH |
| Self inductance $L_4$ | 135 μH | 135.6 μH |
| Resonance Cap $C_1$ | 56.78 nF | 56.76 nF |
| Resonance Cap $C_2$ | 75.1 nF | 75.76 nF |
| Resonance Cap $C_3$ | 64.15 nF | 64.12 nF |
| Resonance Cap $C_4$ | 5.4.54 nF | 54.51 nF |

Figure 14A:
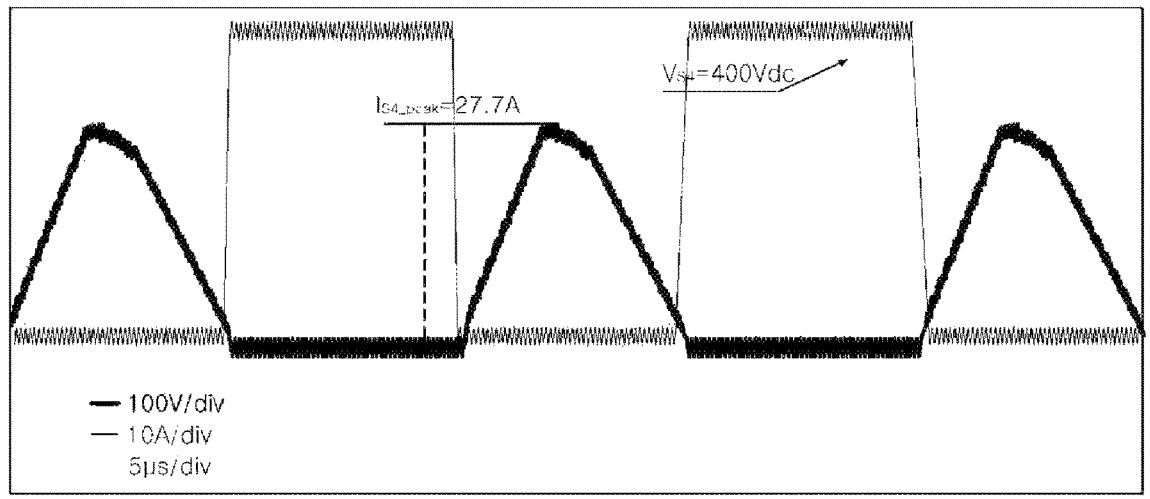
FIGS. 14A to 16 are diagrams for illustrating advantageous effects of the resonance converter for a wireless charger according to an embodiment of the present disclosure.
Figure 14B:
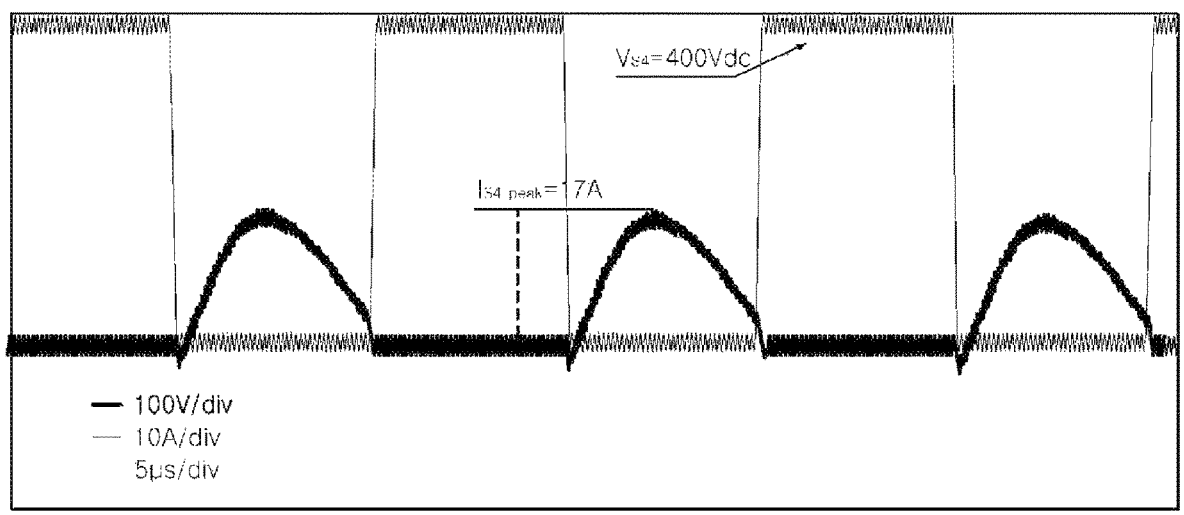

Referring to FIGS. 14a and 14b, when the resonance converter 100 for a wireless charger according to an embodiment of the present disclosure operates in the constant-current mode and the constant-voltage mode with output powers of 6.6 kW and 3.3 kW, respectively, it may be found that the fourth switch $S_4$ provided at the full bridge inverter 110 performs a turn-on operation under the zero voltage switching condition and performs a turn-off operation under the zero current switching condition. In other words, the resonance converter 100 for a wireless charger according to an embodiment of the present disclosure allows a switching operation when the switch elements provided at the full bridge inverter 110 are under the soft switching condition, thereby improving the overall efficiency.

Figure 15A:
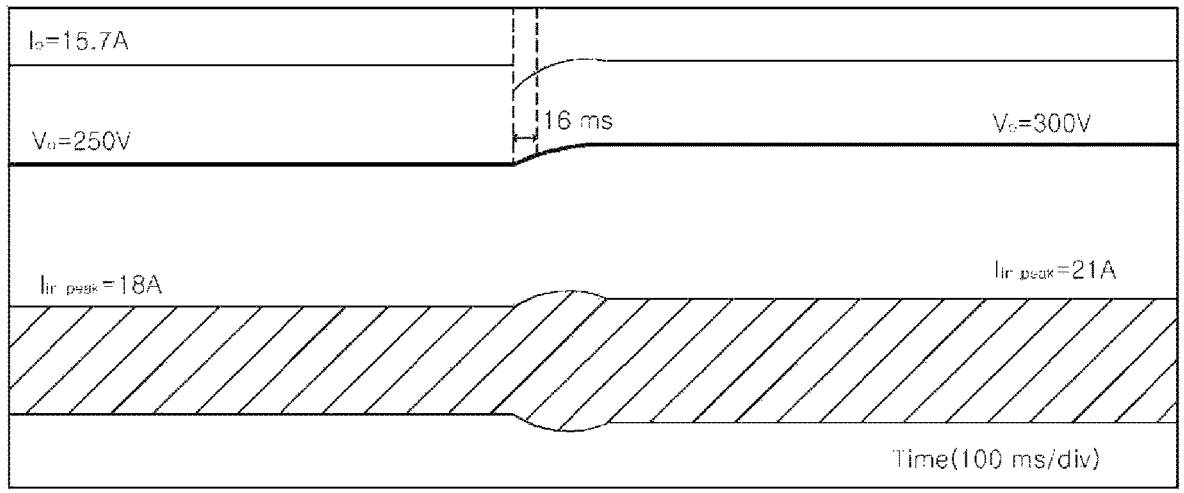
Figure 15B:
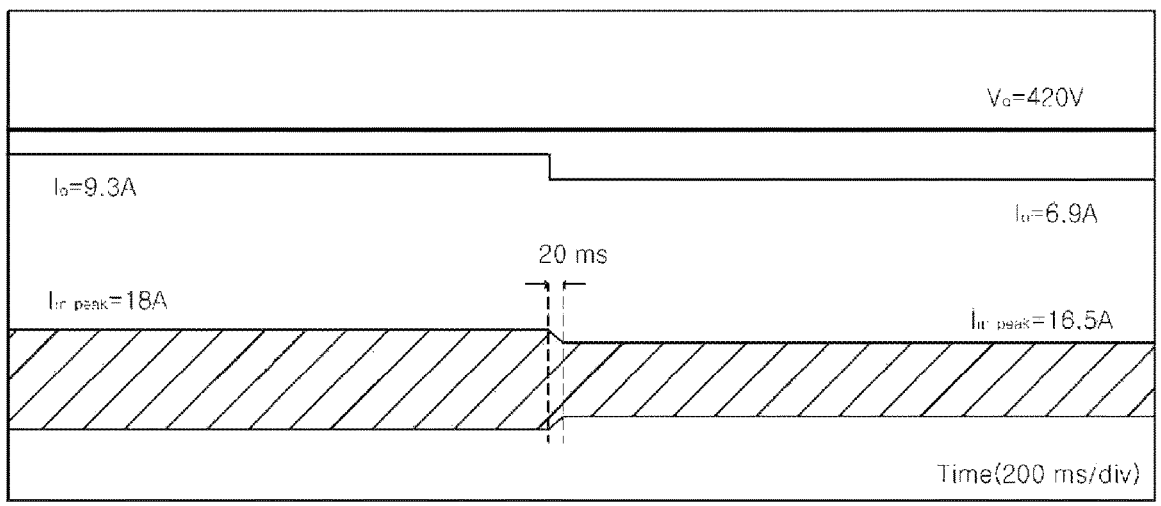

In addition, referring to FIGS. 15a and 15b, it may be found that the power reference changes from 3.9 kW to 4.8 kW when the resonance converter 100 for a wireless charger according to an embodiment of the present disclosure operates in the constant-current mode and the current reference changes from 3.9 kW to 2.9 kW when the resonance converter 100 for a wireless charger according to an embodiment of the present disclosure operates in the constant-voltage mode. Here, the transition time was measures as 16 msec and 20 msec, respectively, and this means that it is suitable for implementing as a battery charging device.

Figure 16:
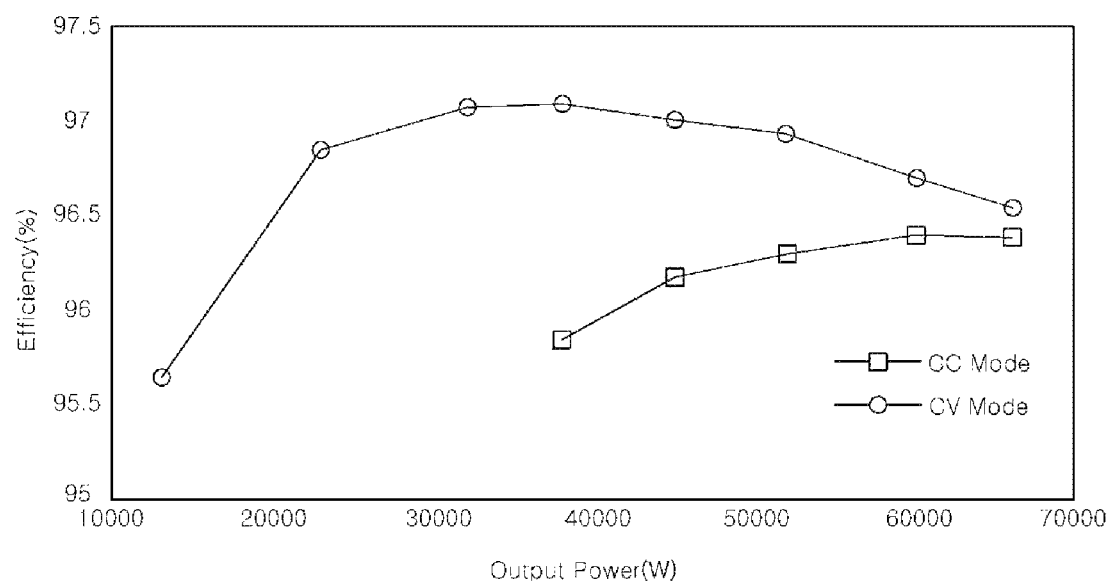

Finally, referring to FIG. 16, the efficiency when the resonance converter 100 for a wireless charger according to an embodiment of the present disclosure performs a charging operation in the constant-current mode and the constant-voltage mode may be found. At this time, it may be found that the maximum efficiency is 97.08% at an output power of 3.7 kW during the operation in the constant-voltage mode, and the maximum efficiency is 96.39% at an output power of 6.1 kW during the operation in the constant-current mode.

While the present disclosure has been described with reference to the embodiments, it will be understood by those skilled in the art that various changes and modifications may be made without departing from the scope of the present disclosure as set forth in the appended claims.

The invention claimed is:

1. A resonance converter for a wireless charger, comprising:
    a full bridge inverter connected to an input power source that supplies an input voltage and having first to fourth switches;
    a resonance tank comprising:
        a primary resonance tank comprising at least one first resonator and configured to receive the input voltage from the full bridge inverter and at least one first intermediate resonator loosely coupled to the at least one first resonator; and
        a secondary resonance tank comprising at least one second resonator and coupled to a rectification bridge and at least one second intermediate resonator loosely coupled to the at least one second resonator; and
    the rectification bridge configured to rectify an output voltage sent from the resonance tank and transfer the rectified output voltage to a battery,
    wherein when operating under a constant-current mode frequency condition with a fixed frequency, the resonance tank outputs a current of a constant magnitude to the rectification bridge, and
    wherein when the resonance tank operates under the constant-current mode frequency condition, a zero phase angle condition of an input impedance is achieved and the first to fourth switches provided at the full bridge inverter performs a switching operation under a soft switching condition.

2. The resonance converter for the wireless charger of claim 1,
    wherein each of the at least one first resonator, the at least one second resonator, the at least one first intermediate resonator, and the at least one second intermediate resonator comprises at least one coil and at least one capacitor in series and the resonance tank performs voltage conversion in an inductive power transfer manner.

3. The resonance converter for the wireless charger of claim 1, further comprising:
    a control circuit configured to control the full bridge inverter in order to provide a sufficient phase margin at a crossover frequency of a constant-current mode for constant-current charging of the battery and a constant-voltage mode for constant-voltage charging of the battery.

4. A resonance converter for a wireless charger, comprising:
    a full bridge inverter connected to an input power source that supplies an input voltage and having first to fourth switches;
    a resonance tank comprising:
        a primary resonance tank comprising at least one first resonator and configured to receive the input voltage from the full bridge inverter and at least one first intermediate resonator loosely coupled to the at least one first resonator; and
        a secondary resonance tank comprising at least one second resonator and coupled to a rectification bridge and at least one second intermediate resonator loosely coupled to the at least one second resonator; and
    the rectification bridge configured to rectify an output voltage sent from the resonance tank and transfer the rectified output voltage to a battery,
    wherein when operating under a constant-voltage mode frequency condition with a fixed frequency, the resonance tank outputs a voltage of a constant magnitude to the rectification bridge, and
    wherein when the resonance tank operates under the constant-voltage mode frequency condition, a zero phase angle condition of an input impedance is achieved and the first to fourth switches provided at the full bridge inverter performs a switching operation under a soft switching condition.

5. The resonance converter for the wireless charger of claim 4, further comprising a control circuit configured to control the full bridge inverter in order to provide a sufficient phase margin at a crossover frequency of a constant-current mode for constant-current charging of the battery and a constant-voltage mode for constant-voltage charging of the battery.

6. A resonance converter for a wireless charger, comprising:
    a full bridge inverter connected to an input power source that supplies an input voltage and having first to fourth switches;
    a resonance tank comprising:
        a primary resonance tank comprising at least one first resonator and configured to receive the input voltage from the full bridge inverter and at least one first intermediate resonator loosely coupled to the at least one first resonator; and
        a secondary resonance tank comprising at least one second resonator and coupled to a rectification bridge and at least one second intermediate resonator loosely coupled to the at least one second resonator;
    the rectification bridge configured to rectify an output voltage sent from the resonance tank and transfer the rectified output voltage to a battery; and
    a control circuit configured to control the full bridge inverter in order to provide a sufficient phase margin at a crossover frequency of a constant-current mode for constant-current charging of the battery and a constant-voltage mode for constant-voltage charging of the battery,
    wherein the control circuit comprises:
    a mode change switch configured to compare a power of the battery with a reference power and perform a switching operation and different controls are performed depending on the constant-current mode or the constant-voltage mode;
    a proportional-integral (PI) controller configured to control a switching operation of switching elements provided at the full bridge inverter and the resonance tank operates in an inductive region; and
    an anti-windup circuit configured to reduce an overshoot and transient time caused by the operation of the PI controller.

7. A method for implementing a resonance converter for a wireless charger, wherein the resonance converter performs voltage conversion in an inductive power transfer manner between a primary resonance tank having at least one first resonator and at least one first intermediate resonator loosely coupled to the at least on first resonator and at least one secondary resonance tank having a second resonator and at least one second intermediate resonator loosely coupled to the at least one second resonator, and transfers a voltage of an input terminal connected to the primary resonance tank to an output terminal connected to the secondary resonance tank, the method comprising:

setting self-inductance of a first coil included in the at least one first resonator and a fourth coil included in the at least one second resonator and maximizing a coupling coefficient between the first coil and the fourth coil;

calculating the number of turns of a second coil included in the at least one first intermediate resonator and a third coil included in the at least one second intermediate resonator and the second coil and the third coil respectively have a maximum quality recognition value;

setting resonance frequencies of the first to fourth coils; and calculating capacitance of first to fourth capacitors connected to the first to fourth coils in series depending on the inductance and the resonance frequency of the first to fourth coils, thereby implementing the resonance tank, wherein the at least one first resonator is connected to a full bridge inverter that is provided at the input terminal and has first to fourth switches and transfers the input voltage to the resonance tank, wherein the at least one second resonator is connected to a rectification bridge that is provided at the output terminal and has first to fourth diodes and rectifies an output of the resonance tank, wherein when operating under a constant-current mode frequency condition with a fixed frequency, the resonance tank outputs a current of a constant magnitude to the rectification bridge, and wherein when the resonance tank operates under the constant-current mode frequency condition, a zero phase angle condition of an input impedance is achieved and the first to fourth switches provided at the full bridge inverter performs a switching operation under a soft switching condition.

* * * * *